(12) United States Patent
Hu et al.

(10) Patent No.: US 12,388,612 B2
(45) Date of Patent: Aug. 12, 2025

(54) OPTIMIZATION OF BCC INTERLEAVER AND LDPC TONE MAPPER FOR DISTRIBUTED-TONE RESOURCE UNITS AND DISTRIBUTED-TONE MULTI-RESOURCE UNITS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 505 days.

(21) Appl. No.: 17/837,387

(22) Filed: Jun. 10, 2022

(65) Prior Publication Data

US 2023/0006805 A1  Jan. 5, 2023

Related U.S. Application Data

(60) Provisional application No. 63/217,818, filed on Jul. 2, 2021.

(51) Int. Cl.
*H04L 5/00* (2006.01)
*H04L 1/00* (2006.01)
*H04W 72/0453* (2023.01)

(52) U.S. Cl.
CPC .......... *H04L 5/0094* (2013.01); *H04L 1/0061* (2013.01); *H04L 1/0071* (2013.01); *H04W 72/0453* (2013.01)

(58) Field of Classification Search
CPC ... H04L 5/0094; H04L 1/0061; H04L 1/0071; H04L 5/0048; H04L 1/0041;
(Continued)

(56) References Cited

U.S. PATENT DOCUMENTS

2017/0318559 A1  11/2017  Islam et al.
2019/0238288 A1  8/2019  Liu et al.
(Continued)

FOREIGN PATENT DOCUMENTS

CN  112600569 A  4/2021
TW  202116021 A  4/2021

OTHER PUBLICATIONS

Taiwan Intellectual Property Office, Office Action for Taiwan Patent Application No. 111124756, Jan. 5, 2023.
(Continued)

*Primary Examiner* — Jae Y Lee
*Assistant Examiner* — Nhu Pham
(74) *Attorney, Agent, or Firm* — Andy M. Han; Han IP PLLC

(57) ABSTRACT

Various schemes pertaining to optimization of binary convolutionally encoded (BCC) interleaver and low-density parity-check (LDPC) tone mapper for distributed-tone resource units (RUs) and multi-resource units (MRUs) in 6 GHZ low-power indoor (LPI) systems are described. An apparatus processes a plurality of subcarriers of a RU to generate a distributed-tone RU (dRU) or a distributed-tone multi-RU (dMRU). The apparatus then transmits the dRU or the dMRU to another apparatus. In processing the plurality of subcarriers, the apparatus codes a plurality of information bits by either LDPC encoding or BCC encoding and transmitting the plurality of subcarriers with one or more optimization parameters using a LDPC tone mapper or a BCC interleaver.

18 Claims, 11 Drawing Sheets

(58) Field of Classification Search
CPC ....... H04L 1/0057; H04L 1/04; H04L 1/0059; H04W 72/0453; G10L 19/005
See application file for complete search history.

(56) References Cited

U.S. PATENT DOCUMENTS

| | | | |
|---|---|---|---|
| 2020/0014509 A1 | 1/2020 | Asterjadhi et al. | |
| 2021/0044398 A1* | 2/2021 | Noh | H04L 1/0041 |
| 2021/0099248 A1 | 4/2021 | Hu et al. | |
| 2021/0392661 A1* | 12/2021 | Cao | H04W 72/0453 |
| 2022/0353015 A1* | 11/2022 | Yu | H04L 5/0053 |

OTHER PUBLICATIONS

China National Intellectual Property Administration, First Office Action in China Patent Application No. 202210769886.0, Mar. 21, 2025.

* cited by examiner

| Parameter | dRU / dMRU Size (Number of Tones) | | | | | | |
|---|---|---|---|---|---|---|---|
| | 26 | 52 | 52+26 | 106 | 106+26 | 242 | 484 |
| $D_{TM}$ | 1 or 3 or 6 | 1 or 8 or 12 | 1 or 9 or 12 | 1 or 3 or 17 | 1 or 9 or 14 | 1 or 9 or 13 or 18 | 1 or 12 or 18 or 26 |

| Parameter | dRU / dMRU Size (Number of Tones) | | | | | |
|---|---|---|---|---|---|---|
| | 26 | 52 | 52+26 | 106 | 106+26 | 242 |
| $N_{col}$ | 8 | 16 or 8* | 18 or 12* | 17 | 21 or 14* | 26 |
| $N_{row}$ | $3 \times N_{bpscs}$ | 3 or $6^* \times N_{bpscs}$ | 4 or $6^* \times N_{bpscs}$ | $6 \times N_{bpscs}$ | 6 or $9^* \times N_{bpscs}$ | $9 \times N_{bpscs}$ |
| $N_{rot}$ | 2 | 11 | 18 | 29 | 31 | 58 |

1100 

```
┌─────────────────────────────────────────┐
│ PROCESS, BY A PROCESSOR OF AN APPARATUS, A │
│ PLURALITY OF SUBCARRIERS OF A RESOURCE UNIT │
│ (RU) TO GENERATE A DISTRIBUTED-TONE RU (dRU) OR │
│ A DISTRIBUTED-TONE MULTI-RU (dMRU) BY CODING A │
│ PLURALITY OF INFORMATION BITS BY EITHER LOW- │
│ DENSITY PARITY-CHECK (LDPC) ENCODING OR BINARY │
│ CONVOLUTIONALLY-CODED (BCC) ENCODING TO │
│ TRANSMIT THE PLURALITY OF SUBCARRIERS WITH ONE │
│ OR MORE OPTIMIZATION PARAMETERS USING A LDPC │
│ TONE MAPPER OR A BCC INTERLEAVER │
│                                         │
│                  1110                   │
└─────────────────────────────────────────┘
```

```
┌─────────────────────────────────────────┐
│ TRANSMIT, BY THE PROCESSOR VIA A TRANSMITTER OF │
│ THE APPARATUS, THE dRU OR THE dMRU TO ANOTHER │
│                 APPARATUS               │
│                                         │
│                  1120                   │
└─────────────────────────────────────────┘
```

FIG. 11

OPTIMIZATION OF BCC INTERLEAVER AND LDPC TONE MAPPER FOR DISTRIBUTED-TONE RESOURCE UNITS AND DISTRIBUTED-TONE MULTI-RESOURCE UNITS

CROSS REFERENCE TO RELATED PATENT APPLICATION

The present disclosure is part of a non-provisional patent application claiming the priority benefit of U.S. Provisional Patent Application Nos. 63/217,818, filed 2 Jul. 2021, the content of which being incorporated by reference in its entirety.

TECHNICAL FIELD

The present disclosure is generally related to wireless communications and, more particularly, to optimization of binary convolutionally-coded (BCC) interleaver and low-density parity-check (LDPC) tone mapper for distributed-tone resource units (dRUs) and distributed-tone multi-resource units (dMRUs).

BACKGROUND

Unless otherwise indicated herein, approaches described in this section are not prior art to the claims listed below and are not admitted as prior art by inclusion in this section.

There are strict power spectral density (PSD) requirements for low-power indoor (LPI) applications in 6 GHz which tend to result in lower power in transmission and short coverage range. One approach to improving coverage range is to distribute tones of a regular resource unit (RU) (herein interchangeably referred to as "rRU", "regular RU" and "logical RU") over a wider bandwidth or a large frequency subblock, thereby resulting in interleaved, interlaced or otherwise dRUs and dMRUs to boost transmission power and achieve better coverage range for 6 GHz low-power indoor (LPI) systems. Unlike rRUs in which subcarriers are basically continuous or adjacent to one another, the subcarriers in dRUs are spread over a wider bandwidth and hence the tones are separated apart with different distances therebetween. While BCC interleavers and LDPC tone mappers are used in rRU transmission to achieve diversity gain, how to optimize parameters for BCC interleavers and LDPC tone mappers to achieve better performance or simpler design in dRU/dMRU applications still needs to be defined. This is because of different tone patterns between a rRU and a dRU, as the tones of rRUs are consecutive during transmission while the tones of dRUs/dMRUs are distributed over a wider bandwidth and not consecutive or adjacent with one another as with rRUs. As such, parameters for BCC interleavers and LDPC tone mappers need to be optimized for transmission of dRUs/dMRUs. Therefore, there is a need for a solution for optimization of BCC interleavers and LDPC tone mappers for dRUs and dMRUs in 6 GHZ LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to optimization of BCC interleavers and LDPC tone mappers for dRUs and dMRUs in 6 GHZ LPI systems.

In one aspect, a method may involve a processor of an apparatus processing a plurality of subcarriers of a RU to generate a dRU or a dMRU. The method may also involve the processor transmitting, via a transmitter of the apparatus, the dRU or the dMRU to another apparatus. In processing the plurality of subcarriers, the method may involve the processor coding a plurality of information bits by either LDPC encoding or BCC encoding and transmitting the plurality of subcarriers with one or more optimization parameters using a LDPC tone mapper or a BCC interleaver.

In another aspect, an apparatus may include a transceiver and a processor coupled to the transceiver. The transceiver may be configured to transmit and receive wirelessly. The processor may be configured to process a plurality of subcarriers of a RU to generate a dRU or a dMRU. The processor may also be configured to transmit, via a transmitter of the apparatus, the dRU or the dMRU to another apparatus. In processing the plurality of subcarriers, the processor may code a plurality of information bits by either LDPC encoding or BCC encoding and transmit the plurality of subcarriers with one or more optimization parameters using a LDPC tone mapper or a BCC interleaver.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 6 is a diagram of an example design under a proposed scheme in accordance with the present disclosure.

FIG. 9 is a diagram of an example design under a proposed scheme in accordance with the present disclosure.

FIG. 11 is a flowchart of an example process in accordance with an implementation of the present disclosure.

DETAILED DESCRIPTION OF PREFERRED EMBODIMENTS

Figure 1:
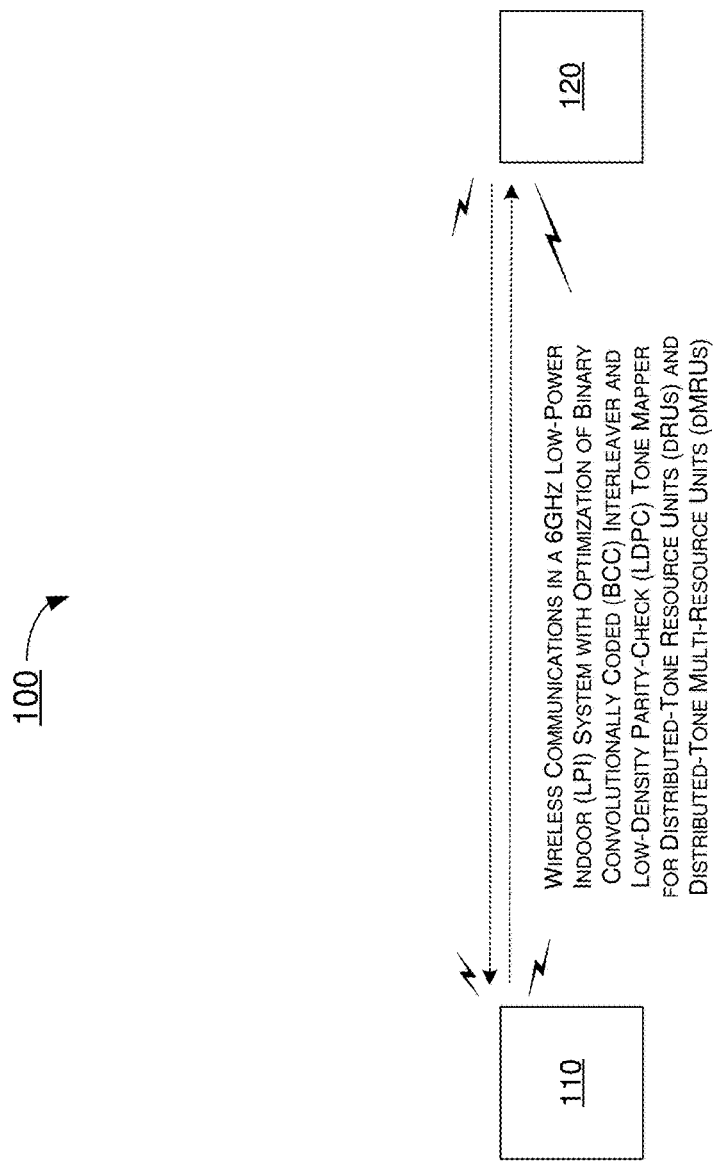
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to optimization of BCC interleavers and LDPC tone mappers for dRUs and dMRUs in 6 GHZ LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone (or interlaced-tone) RU may be interchangeably denoted as iRU26 as well as dRU26 (26-tone distributed-tone RU), a 52-tone interleaved-tone (or interlaced-tone) RU may be interchangeably denoted as iRU52 as well as dRU52 (52-tone distributed-tone RU), a 106-tone interleaved-tone (or interlaced-tone) RU may be interchangeably denoted as iRU106 as well as dRU106 (106-tone distributed-tone RU), a 242-tone interleaved-tone (or interlaced-tone) RU may be interchangeably denoted as iRU242 as well as dRU242 (242-tone distributed-tone RU), and a 484-tone interleaved-tone (or interlaced-tone) RU may be interchangeably denoted as iRU484 as well as dRU484 (484-tone distributed-tone RU).

FIG. 1 illustrates an example network environment 100 in which various solutions and schemes in accordance with the present disclosure may be implemented. FIG. 2~FIG. 11 illustrate examples of implementation of various proposed schemes in network environment 100 in accordance with the present disclosure. The following description of various proposed schemes is provided with reference to FIG. 1~FIG.

Referring to FIG. 1, network environment 100 may involve a communication entity 110 and a communication entity 120 communicating wirelessly (e.g., in a WLAN in accordance with one or more Institute of Electrical and Electronics Engineers (IEEE) 802.11 standards). For instance, communication entity 110 may be a first station (STA) and communication entity 120 may be a second STA, with each of the first STA and second STA functioning as either an access point (AP) STA or a non-AP STA. Under various proposed schemes in accordance with the present disclosure, communication entity 110 and communication entity 120 may be configured to communicate wirelessly with optimization of BCC interleavers and LDPC tone mappers for dRUs and dMRUs in 6 GHZ LPI systems, as described herein.

Figure 2:
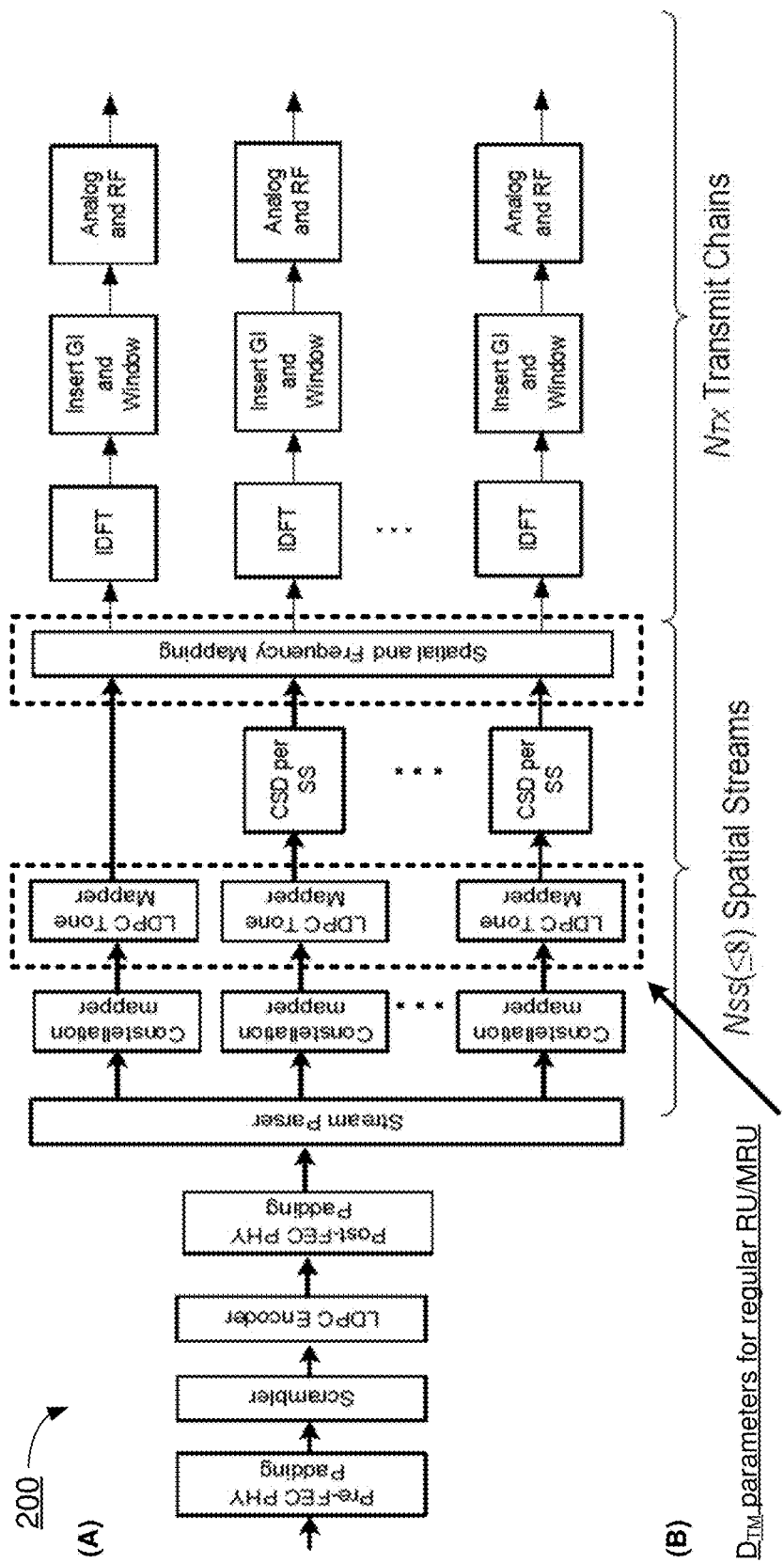
FIG. 2 is a diagram of an example design under a proposed scheme in accordance with the present disclosure.

FIG. 2 illustrates an example design 200 under a proposed scheme in accordance with the present disclosure. Specifically, part (A) of FIG. 2 shows a design 200 of a transmitter block diagram with LDPC encoding functionality. Design 200 may include a number of functional blocks such as, for example and without limitation, a pre-forward error checking (pre-FEC) physical layer (PHY) padding block, a scrambler, a LDPC encoder, a post-FEC PHY padding block, a stream parser that parses an incoming stream of tones into a number of spatial streams ($N_{SS}$), a plurality of $N_{SS}$ constellation mappers, a plurality of $N_{SS}$ LDPC tone mappers, a cyclic-shift diversity (CSD) block for each of the $N_{SS}$ spatial streams, a spatial and frequency mapping block that maps the tones into a number of transmit chains ($N_{TX}$), a plurality of $N_{TX}$ inverse discrete Fourier transform (IDFT) blocks, a plurality of $N_{TX}$ guard interval and window insertion blocks, and a plurality of $N_{TX}$ analog and radio frequency (RF) blocks. In design 200, $N_{SS}$ may be equal to or less than 8 (or $N_{SS} \leq 8$). It is noteworthy that some or all of the functional blocks of design 200 may be implemented by hardware components such as electronic circuitry composed of resistor(s), capacitor(s), inductor(s) and/or transistor(s).

Part (B) of FIG. 2 shows a table of parameters for regular RUs and regular MRUs of different sizes ranging from 26 tones to 996 tones. For each size of RU/MRU, a value of a tone mapping distance ($D_{TM}$) and a value of $D_{TM}$ with dual-carrier modulation (DCM) (or $D_{TM\_DCM}$) are shown. These parameters may be applied by the plurality of LDPC tone mappers. Moreover, in design 200, for regular (or logical) RUs, frequency mapping by the spatial and frequency mapping block may be based on the consecutive (or adjacent) rRU subcarrier indices. On the other hand, for dRUs and dMRUs, frequency mapping by the spatial and frequency mapping block may be replaced with dRU/dMRU tone indices which distribute the tones over a wider bandwidth or a frequency subblock (compared to that for a rRU).

Figure 3:
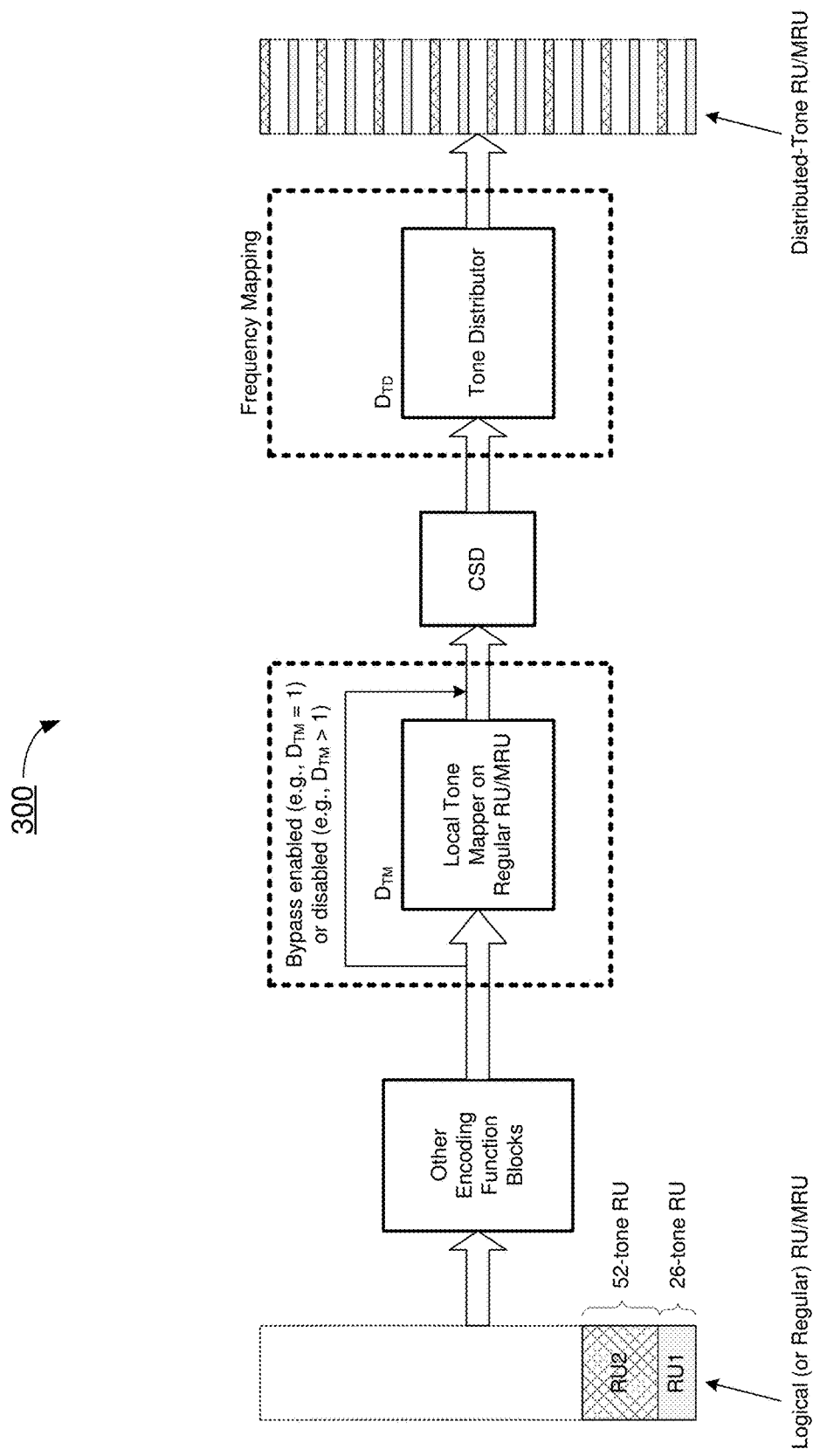
FIG. 3 is a diagram of an example design under a proposed scheme in accordance with the present disclosure.

FIG. 3 illustrates an example design 300 under a proposed scheme in accordance with the present disclosure. Specifically, FIG. 3 shows a design 300 of a dRU/dMRU transmitter block diagram with LDPC encoding functionality. Design 300 may include a number of functional blocks such as, for example and without limitation, encoding and processing functional blocks (which may be the same as those used for encoding regular RUs/MRUs), a local tone mapper on regular RUs/MRUs with a bypass, a CSD block, and a tone distributor. In operation, the encoding and processing functional blocks may take, as input, one or more regular (or logical) RUs (e.g., a 26-tone RU, or RU1, and a 52-tone RU, or RU2) and perform encoding and processing as normally be performed on regular RUs/MRUs, the result of which is provided to the local tone mapper. Bypassing of the local tone mapper may be either enabled (e.g., when $D_{TM}=1$) or disabled (e.g., when $D_{TM}>1$), depending on $D_{TM}$. That is, the tone mapper on regular RUs/MRUs may be either bypassed or not bypassed, corresponding to the value of $D_{TM}$. The CSD block may perform the same or similar functionality as for regular RUs/MRUs. The tone distributor may perform frequency mapping based on dRU/dMRU tone indices with a certain tone separation distance (DTD) to map tones of the dRU/dMRU over a wider bandwidth or a frequency subblock for transmission of the dRU/dMRU (e.g., in a physical-layer protocol data unit (PPDU)).

Figure 4:
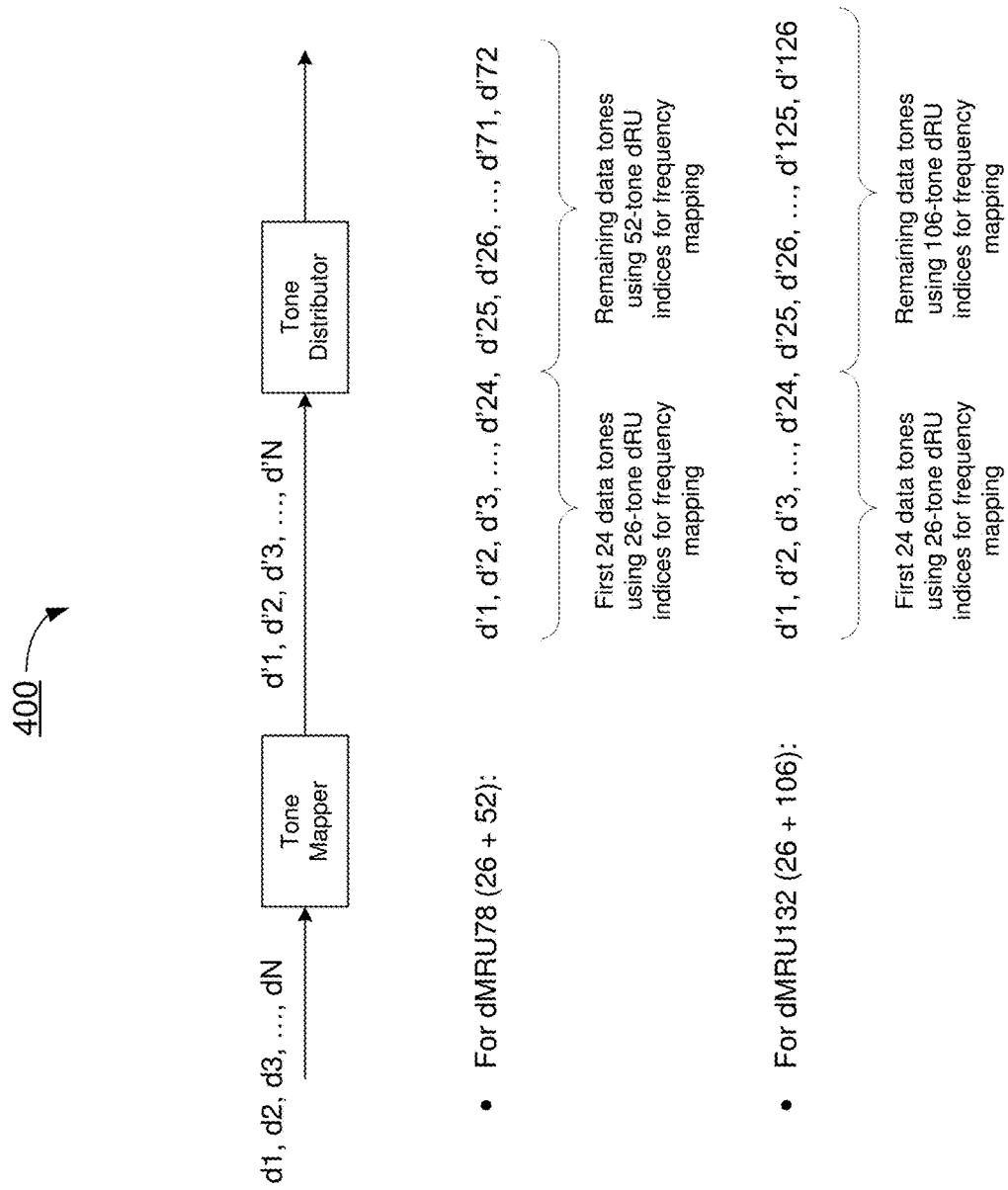
FIG. 4 is a diagram of an example scenario under a proposed scheme in accordance with the present disclosure.

FIG. 4 illustrates an example scenario 400 under a proposed scheme in accordance with the present disclosure. Specifically, scenario 400 shows a scenario of tone mapper and frequency mapping for dMRUs under the proposed scheme. For a dMRU (e.g., a distributed MRU78 or MRU132), similar to a regular MRU, a joint tone mapper may be applied in tone/frequency mapping. Under the proposed scheme, inside the frequency mapping functional block, the tones of an MRU may be distributed based on dMRU subcarrier indices shown in FIG. 4. That is, a number of tones d1, d2, d3, . . . , dN (with N denoting the number of tones) may be received and processed jointly by the tone mapper to produce tones d'1, d'2, d'3, . . . , d'N that are distributed based on corresponding dMRU subcarrier indices. For instance, for dMRU78 (as an aggregate of two RUs, namely RU26 and RU52, with N=78), the first 24 data tones may be distributed using the subcarrier indices of a 26-tone dRU for frequency mapping while the remaining data tones may be distributed using the subcarrier indices of a 52-tone dRU for frequency mapping, with some of the 78 tones being pilot tones. As another example, for dMRU132 (as an aggregate of two RUs, namely RU26 and RU106, with N=132), the first 24 data tones may be distributed using the subcarrier indices of a 26-tone dRU for frequency mapping while the remaining data tones may be distributed using the subcarrier indices of a 106-tone dRU for frequency mapping, with some of the 132 tones being pilot tones.

Figure 5:
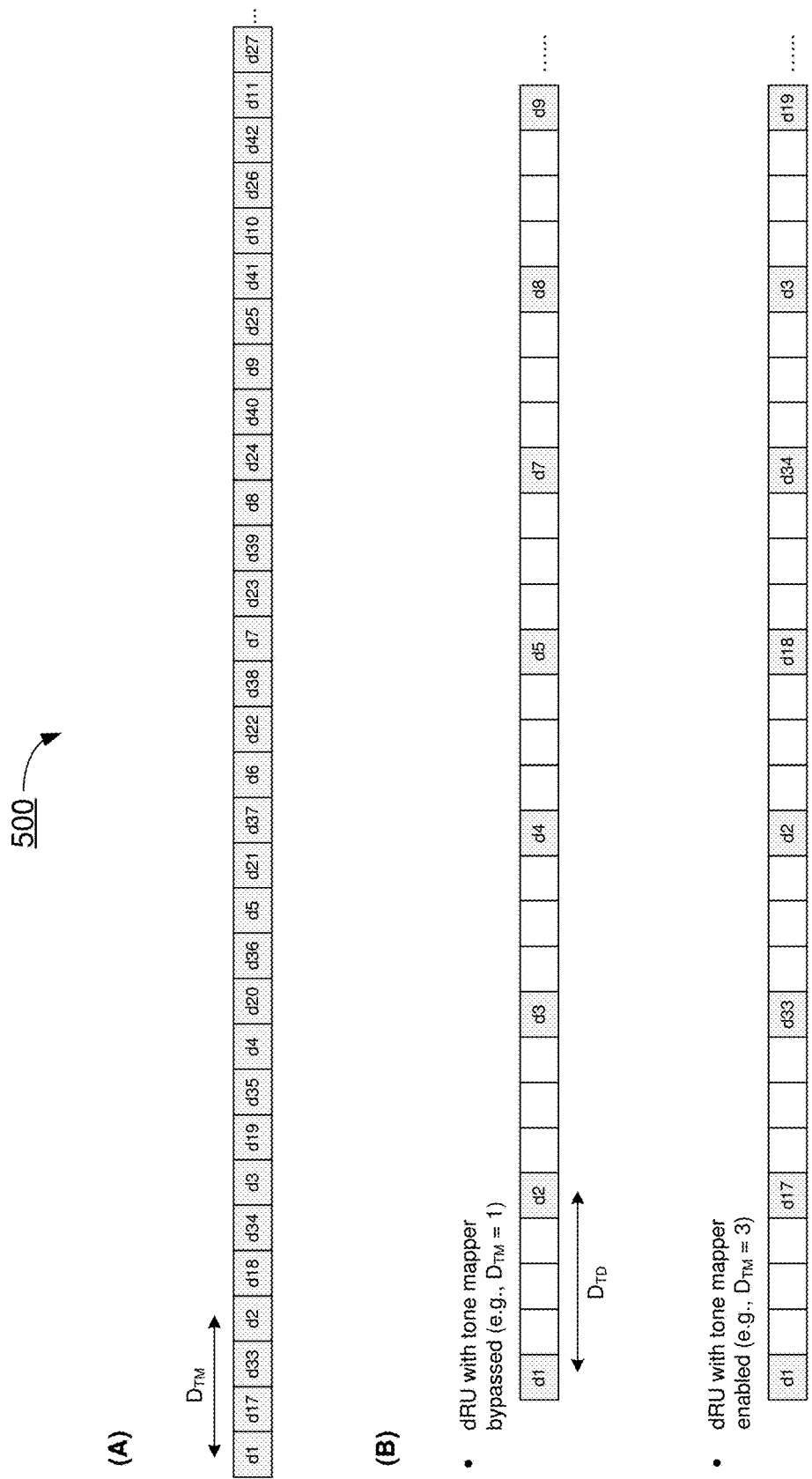
FIG. 5 is a diagram of an example scenario under a proposed scheme in accordance with the present disclosure.

FIG. 5 illustrates an example scenario 500 under a proposed scheme in accordance with the present disclosure. Specifically, scenario 500 shows a scenario of LDPC tone mapper for dRU/dMRU. Under the proposed scheme, a LDPC tone mapper may be utilized to map consecutive data constellation points to separate tones with a distance of at least $D_{TM}$ to achieve frequency diversity. Part (A) of FIG. 5 shows an example of tone mapping for a regular 52-tone RU with $D_{TM}=3$, with input data tones being d1, d2, d3, . . . and so on.

Under the proposed scheme, for a distributed-tone RU/MRU (or dRU/dMRU), the subcarriers may be distributed over a wider bandwidth, thereby resulting in the tones being not consecutive or adjacent to one another, and the separation distance between the tones (e.g., DID) may be dependent on the RU size and distribution bandwidth. Part (B) of FIG. 5 shows an example of a 52-tone dRU distributed on BW20 with tone mapper bypassed or enabled (e.g., $D_{TM}=3$).

FIG. 6 illustrates an example design 600 under a proposed scheme in accordance with the present disclosure. Under a first option (Option-1) of the proposed scheme, the same regular RU $D_{TM}$ parameters may be reused for dRUs/dMRUs, with the tone mapper being always enabled. Under a second option (Option-2) of the proposed scheme, new proposed tone mapper parameters for dRUs/dMRUs of different sizes, shown in the table of FIG. 6, may be utilized, while keeping a joint LDPC tone mapper for small dMRUs (e.g., up to dMRU132). It is noteworthy that, in design 600, $D_{TM}=1$ may be deemed as equivalent to bypassing the tone mapper.

Figure 7:
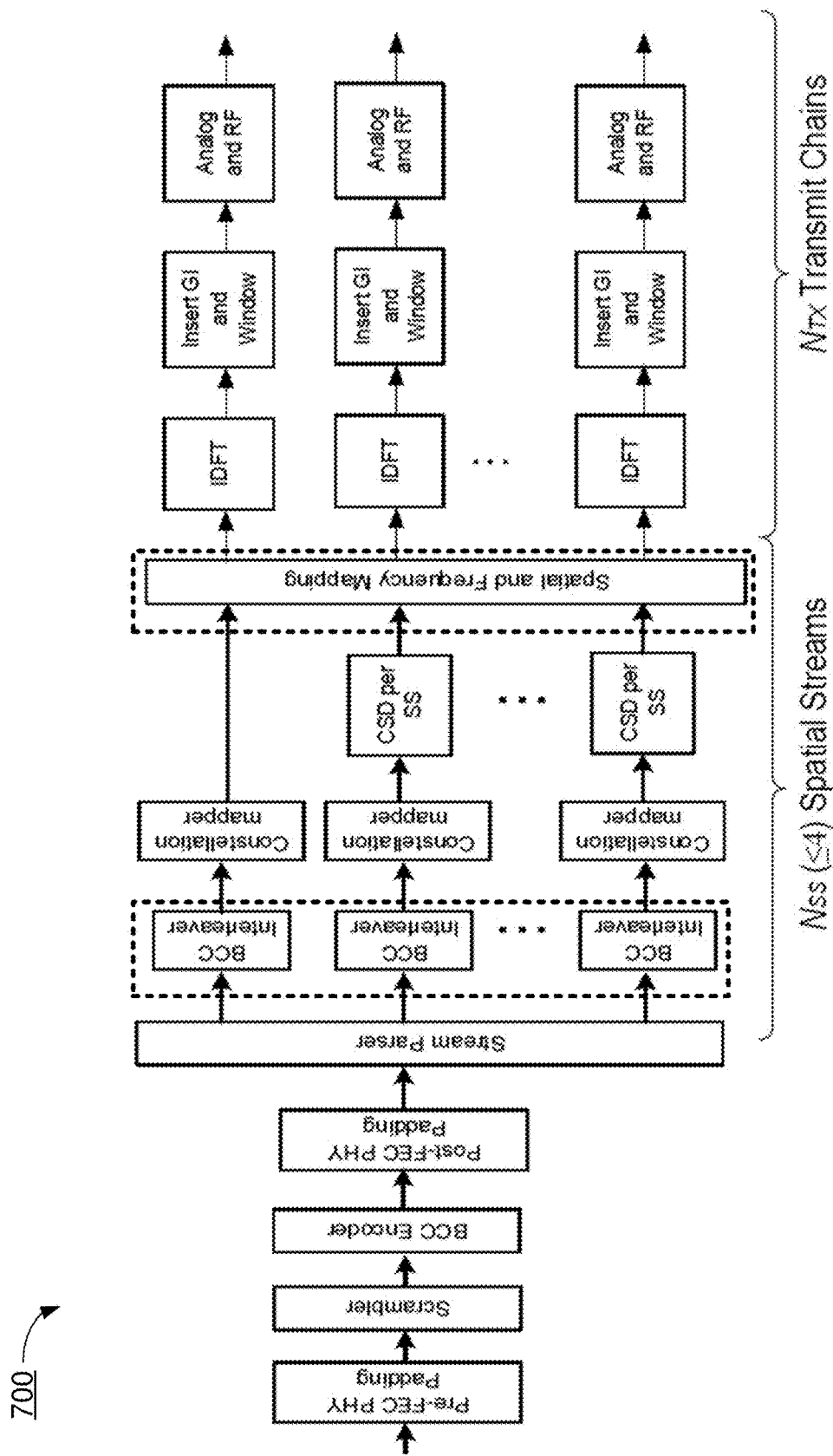
FIG. 7 is a diagram of an example design under a proposed scheme in accordance with the present disclosure.

FIG. 7 illustrates an example design 700 under a proposed scheme in accordance with the present disclosure. Specifically, FIG. 7 shows a design 700 of a transmitter block diagram with BCC encoding functionality. Design 200 may include a number of functional blocks such as, for example and without limitation, a pre-FEC PHY padding block, a scrambler, a BCC encoder, a post-FEC PHY padding block, a stream parser that parses an incoming stream of tones into $N_{SS}$ spatial streams, a plurality of $N_{SS}$ BCC interleavers, a plurality of $N_{SS}$ constellation mappers, a CSD block for each of the $N_{SS}$ spatial streams, a spatial and frequency mapping block that maps the tones into $N_{TX}$ transmit chains, a plurality of $N_{TX}$ IDFT blocks, a plurality of $N_{TX}$ guard interval and window insertion blocks, and a plurality of $N_{TX}$ analog and RF blocks. In design 700, $N_{SS}$ may be equal to or less than 4 (or $N_{SS} \leq 4$). It is noteworthy that some or all of the functional blocks of design 700 may be implemented by hardware components such as electronic circuitry composed of resistor(s), capacitor(s), inductor(s) and/or transistor(s).

In design 700, the same encoding and processing blocks (e.g., the pre-FEC PHY padding block, the scrambler, the BCC encoder, and the post-FEC PHY padding block) used for regular RUs/MRUs may be utilized to encode and process dRUs/dMRUs. Moreover, the same BCC interleavers used for regular RUs/MRUs may also be utilized to perform BCC interleaving for dRUs/dMRUs while applying certain parameters under the proposed scheme for optimization of the BCC interleavers. Moreover, in design 700, for regular (or logical) RUs, frequency mapping by the spatial and frequency mapping block may be based on the consecutive (or adjacent) rRU subcarrier indices. On the other hand, for dRUs and dMRUs, frequency mapping by the spatial and frequency mapping block may be replaced with dRU/dMRU tone indices which distribute the tones over a wider bandwidth (compared to that for a rRU).

Figure 8:
FIG. 8 is a diagram of an example design under a proposed scheme in accordance with the present disclosure.

FIG. 8 illustrates an example design 800 under a proposed scheme in accordance with the present disclosure. Specifically, FIG. 8 shows a table of parameters such as a number of columns ($N_{col}$), a number of rows ($N_{row}$), and a number of rotations ($N_{rot}$) for RUs of different sizes, whether DCM is used or not used. FIG. 8 also shows another table of parameters such as $N_{col}$, $N_{row}$, and $N_{rot}$ for MRUs of different sizes, whether DCM is used or not used.

FIG. 9 illustrates an example design 900 under a proposed scheme in accordance with the present disclosure. Under a first option (Option-1) of the proposed scheme, the same regular RU BCC interleaver parameters may be reused for dRUs/dMRUs. Under a second option (Option-2) of the proposed scheme, new proposed BCC interleaver parameters for dRUs/dMRUs of different sizes, shown in the table of FIG. 6, may be utilized, while keeping a joint BCC interleaver for dMRUs. It is noteworthy that, in the table shown in FIG. 6, values labeled with "*" may be used for dRU/dMRU over BW20. Moreover, some of the values may be dependent on the corresponding number of coded bits per subcarrier spacing ($N_{bpscs}$).

Illustrative Implementations

Figure 10:
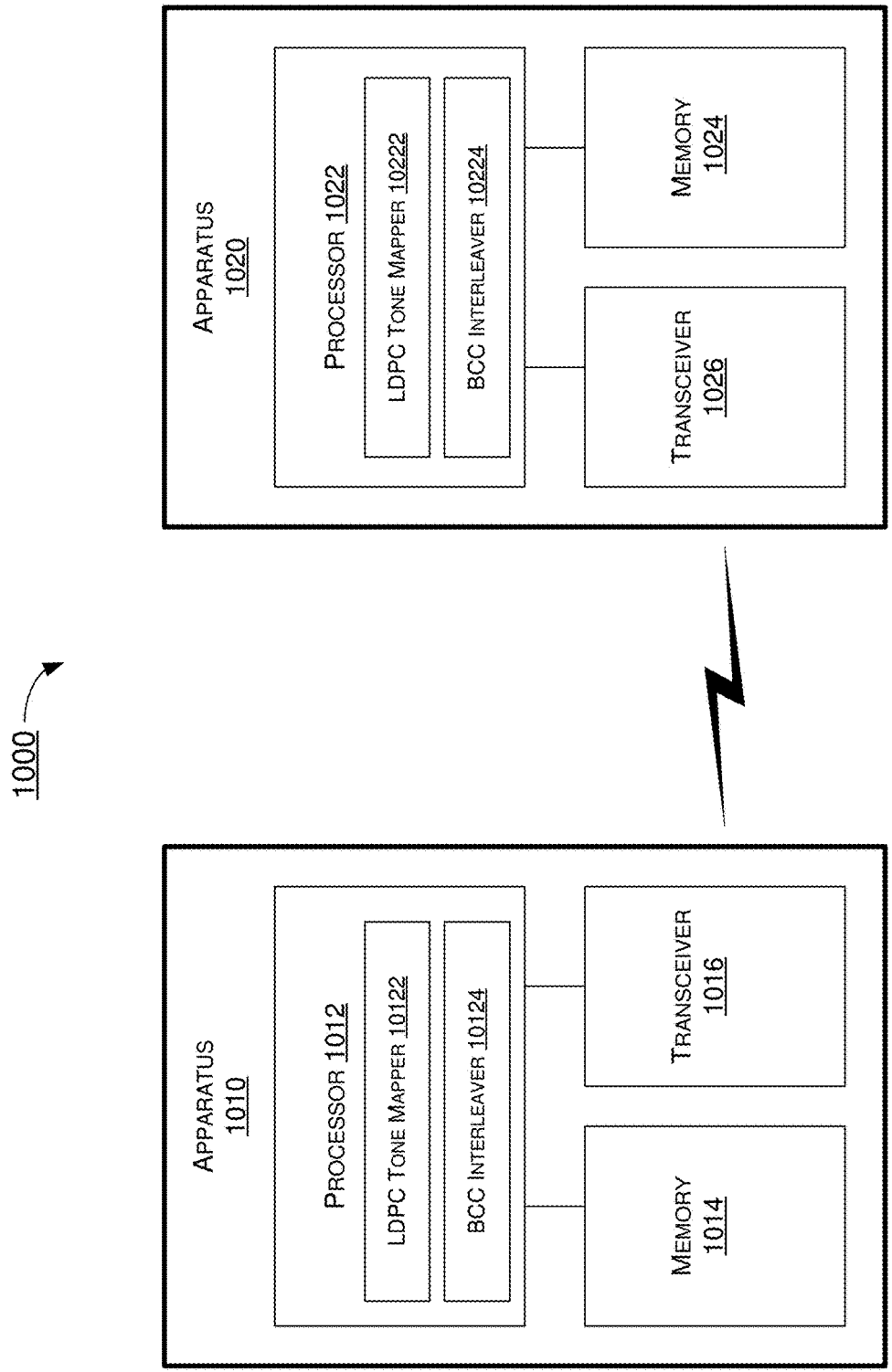
FIG. 10 is a block diagram of an example communication system in accordance with an implementation of the present disclosure.

FIG. 10 illustrates an example system 1000 having at least an example apparatus 1010 and an example apparatus 1020 in accordance with an implementation of the present disclosure. Each of apparatus 1010 and apparatus 1020 may perform various functions to implement schemes, techniques, processes and methods described herein pertaining to optimization of BCC interleavers and LDPC tone mappers for dRUs and dMRUs in 6 GHZ LPI systems, including the various schemes described above with respect to various proposed designs, concepts, schemes, systems and methods described above as well as processes described below. For instance, apparatus 1010 may be an example implementation of communication entity 110, and apparatus 1020 may be an example implementation of communication entity 120.

Each of apparatus 1010 and apparatus 1020 may be a part of an electronic apparatus, which may be a STA or an AP, such as a portable or mobile apparatus, a wearable apparatus, a wireless communication apparatus or a computing apparatus. For instance, each of apparatus 1010 and apparatus 1020 may be implemented in a smartphone, a smart watch, a personal digital assistant, a digital camera, or a computing equipment such as a tablet computer, a laptop computer or a notebook computer. Each of apparatus 1010 and apparatus 1020 may also be a part of a machine type apparatus, which may be an IoT apparatus such as an immobile or a stationary apparatus, a home apparatus, a wire communication apparatus or a computing apparatus. For instance, each of apparatus 1010 and apparatus 1020 may be implemented in a smart thermostat, a smart fridge, a smart door lock, a wireless speaker or a home control center. When implemented in or as a network apparatus, apparatus 1010 and/or apparatus 1020 may be implemented in a network node, such as an AP in a WLAN.

In some implementations, each of apparatus 1010 and apparatus 1020 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1010 and apparatus 1020 may be implemented in or as a STA or an AP. Each of apparatus 1010 and apparatus 1020 may include at least some of those components shown in FIG. 10 such as a processor 1012 and a processor 1022, respectively, for example. Each of apparatus 1010 and apparatus 1020 may further include one or more other components not pertinent to the proposed scheme of the present disclosure (e.g., internal power supply, display device and/or user interface device), and, thus, such component(s) of apparatus 1010 and apparatus 1020 are neither shown in FIG. 10 nor described below in the interest of simplicity and brevity.

In one aspect, each of processor 1012 and processor 1022 may be implemented in the form of one or more single-core processors, one or more multi-core processors, one or more RISC processors or one or more CISC processors. That is, even though a singular term "a processor" is used herein to refer to processor 1012 and processor 1022, each of processor 1012 and processor 1022 may include multiple processors in some implementations and a single processor in other implementations in accordance with the present disclosure. In another aspect, each of processor 1012 and processor 1022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1012 and processor 1022 is a special-purpose machine specifically designed, arranged and configured to perform specific tasks including those pertaining to optimization of BCC interleavers and LDPC tone mappers for dRUs and dMRUs in 6 GHZ LPI systems in accordance with various implementations of the present disclosure. For instance, each of processor 1012 and processor 1022 may be configured with hardware components, or circuitry, implementing one, some or all of the examples described and illustrated herein. As shown in FIG. 10, processor 1012 may be configured with electronic circuits such as a LDPC tone mapper 10122 and a BCC interleaver 10124. Similarly, processor 1022 may be configured with electronic circuits such as a LDPC tone mapper 10222 and a BCC interleaver 10224. Each of LDPC tone mapper 10122, BCC interleaver 10124, LDPC tone mapper 10222, and BCC interleaver 10224 may be configured to implement respective features pertaining to LDPC encoding or BCC encoding described above with respect to FIG. 2~FIG. 9.

In some implementations, apparatus 1010 may also include a transceiver 1016 coupled to processor 1012. Transceiver 1016 may be capable of wirelessly transmitting and receiving data. In some implementations, apparatus 1020 may also include a transceiver 1026 coupled to processor 1022. Transceiver 1026 may include a transceiver capable of wirelessly transmitting and receiving data.

In some implementations, apparatus 1010 may further include a memory 1014 coupled to processor 1012 and capable of being accessed by processor 1012 and storing data therein. In some implementations, apparatus 1020 may further include a memory 1024 coupled to processor 1022 and capable of being accessed by processor 1022 and storing data therein. Each of memory 1014 and memory 1024 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1014 and memory 1024 may include a type of read-only memory (ROM) such as mask ROM, programmable ROM (PROM), erasable programmable ROM (EPROM) and/or electrically erasable programmable ROM (EEPROM). Alternatively, or additionally, each of memory 1014 and memory 1024 may include a type of non-volatile random-access memory (NVRAM) such as flash memory, solid-state memory, ferroelectric RAM (FeRAM), magnetoresistive RAM (MRAM) and/or phase-change memory.

Each of apparatus 1010 and apparatus 1020 may be a communication entity capable of communicating with each other using various proposed schemes in accordance with the present disclosure. For illustrative purposes and without limitation, a description of capabilities of apparatus 1010, as communication entity 110, and apparatus 1020, as communication entity 120, is provided below. It is noteworthy that, although the example implementations described below are provided in the context of WLAN, the same may be implemented in other types of networks. Thus, although the following description of example implementations pertains to a scenario in which apparatus 1010 functions as a transmitting device and apparatus 1020 functions as a receiving device, the same is also applicable to another scenario in which apparatus 1010 functions as a receiving device and apparatus 1020 functions as a transmitting device.

Under a proposed scheme in accordance with the present disclosure with respect to optimization of BCC interleavers and LDPC tone mappers for dRUs and dMRUs in 6 GHZ LPI systems, processor 1012 of apparatus 1010 may process a plurality of subcarriers of a RU to generate a dRU or a dMRU. Moreover, processor 1012 may transmit, via transceiver 1016, the dRU or the dMRU to apparatus 1020. In some implementations, in processing the plurality of subcarriers, processor 1012 may code a plurality of information bits by either LDPC encoding or BCC encoding and transmit the plurality of subcarriers with one or more optimization parameters using LDPC tone mapper 10122 or BCC interleaver 12124.

In some implementations, in processing the plurality of subcarriers, processor 1012 may code the plurality of information bits by LDPC encoding and transmitting the plurality of subcarriers using the LDPC tone mapper 10122.

In some implementations, in coding the plurality of information bits by LDPC encoding and transmitting the plurality of subcarriers using the LDPC tone mapper 10122, processor 1012 may enable or disable the LDPC tone mapper 10122 based on a value of $D_{TM}$.

In some implementations, the LDPC tone mapper may be disabled or bypassed responsive to $D_{TM}=1$. Alternatively, the LDPC tone mapper may be enabled responsive to $D_{TM}>1$.

In some implementations, in coding the plurality of information bits by LDPC encoding and transmitting in the plurality of subcarriers, processor 1012 may perform the LDPC encoding using LDPC tone mapper 10122 on the plurality of subcarriers with one or more parameters used for a rRU in generating the dRU or the dMRU.

In some implementations, in coding the plurality of information bits by LDPC encoding and transmitting in the plurality of subcarriers, processor 1012 may perform the LDPC encoding using LDPC tone mapper 10122 on the plurality of subcarriers with the one or more optimization parameters in generating the dRU or the dMRU.

In some implementations, the one or more optimization parameters may include tone mapper parameters with respect to $D_{TM}$. In some implementations, $D_{TM}=1$ or 3 or 6 for a 26-tone dRU; $D_{TM}=1$ or 8 or 12 for a 52-tone dRU; $D_{TM}=1$ or 9 or 12 for a 78-tone dMRU; $D_{TM}=1$ or 3 or 17 for a 106-tone dRU; $D_{TM}=1$ or 9 or 14 for a 132-tone dMRU; $D_{TM}=1$ or 9 or 13 or 18 for a 242-tone dRU or dMRU; and $D_{TM}=1$ or 12 or 18 or 26 for a 484-tone dRU or dMRU.

In some implementations, in coding the plurality of information bits by LDPC encoding and transmitting the plurality of subcarriers, processor 1012 may code the information bits by LDPC encoding using LDPC tone mapper 10122 with a joint tone mapper in generating the dMRU.

In some implementations, in processing the plurality of subcarriers, processor 1012 may code the plurality of information bits by BCC encoding and transmitting the plurality of subcarriers using the BCC interleaver 10124.

In some implementations, in coding the plurality of information bits by BCC encoding and transmitting the plurality of subcarriers, processor 1012 may perform BCC encoding using the BCC interleaver 10124 with one or more BCC interleaver parameters used for a rRU in generating the dRU or the dMRU.

In some implementations, in coding the plurality of information bits by BCC encoding and transmitting the plurality of subcarriers, processor 1012 may perform BCC encoding using the BCC interleaver 10124 with the one or more optimization parameters in generating the dRU or the dMRU.

In some implementations, the one or more optimization parameters may include BCC interleaver parameters with respect to $N_{col}$, $N_{row}$, $N_{rot}$ and $N_{bpscs}$. In some implementations, $N_{col}=8$, $N_{row}=3 \times N_{bpscs}$, and $N_{rot}=2$ for a 26-tone dRU; $N_{col}=16$, $N_{row}=3 \times N_{bpscs}$, and $N_{rot}=11$ for a 52-tone dRU; $N_{col}=8$, $N_{row}=6 \times N_{bpscs}$, and $N_{rot}=11$ for the 52-tone dRU on a 20 MHz bandwidth; $N_{col}=18$, $N_{row}=4 \times N_{bpscs}$, and $N_{rot}=18$ for a 78-tone dMRU; $N_{col}=12$, $N_{row}=6 \times N_{bpscs}$, and $N_{rot}=18$ for the 78-tone dMRU on the 20 MHz bandwidth; $N_{col}=17$, $N_{row}=6 \times N_{bpscs}$, and $N_{rot}=29$ for a 106-tone dRU; $N_{col}=21$, $N_{row}=6 \times N_{bpscs}$, and $N_{rot}=31$ for a 132-tone dMRU; $N_{col}=14$, $N_{row}=9 \times N_{bpscs}$, and $N_{rot}=31$ for the 132-tone dMRU on the 20 MHz bandwidth; and $N_{col}=26$, $N_{row}=9 \times N_{bpscs}$, and $N_{rot}=58$ for a 242-tone dRU or dMRU.

In some implementations, in coding the plurality of information bits by BCC encoding and transmitting in the plurality of subcarriers, processor 1012 may perform BCC encoding using the BCC interleaver 10124 with a joint BCC interleaver in generating the dMRU.

Illustrative Processes

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to optimization of BCC interleavers and LDPC tone mappers for dRUs and dMRUs in 6 GHZ LPI systems in accordance with the present disclosure. Process 1100 may include one or more operations, actions, or functions as illustrated by one or more of blocks 1110 and 1120. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 1010 and apparatus 1020 as well as any variations thereof. Solely for illustrative purposes and without limiting the scope, process 1100 is described below in the context of apparatus 1010 as communication entity 110 (e.g., a transmitting device whether a STA or an AP) and apparatus 1020 as communication entity 120 (e.g., a receiving device whether a STA or an AP) of a wireless network such as a WLAN in accordance with one or more of IEEE 802.11 standards. Process 1100 may begin at block 1110.

At 1110, process 1100 may involve processor 1012 of apparatus 1010 processing a plurality of subcarriers of a RU to generate a dRU or a dMRU. Process 1100 may proceed from 1110 to 1120.

At 1120, process 1100 may involve processor 1012 transmitting, via transceiver 1016, the dRU or the dMRU to apparatus 1020.

In some implementations, in processing the plurality of subcarriers, process 1100 may involve processor 1012 coding a plurality of information bits by either LDPC encoding or BCC encoding and transmitting the plurality of subcarriers with one or more optimization parameters using LDPC tone mapper 10122 or BCC interleaver 10124.

In some implementations, in processing the plurality of subcarriers, process 1100 may involve processor 1012 coding the plurality of information bits by LDPC encoding and transmitting the plurality of subcarriers using the LDPC tone mapper 10122.

In some implementations, in coding the plurality of information bits by LDPC encoding and transmitting the plurality of subcarriers using the LDPC tone mapper 10122, process 1100 may involve processor 1012 enabling or disabling the LDPC tone mapper based on a value of $D_{TM}$.

In some implementations, the LDPC tone mapper may be enabled responsive to $D_{TM}>1$. Alternatively, the LDPC tone mapper may be disabled or bypassed responsive to $D_{TM}=1$.

In some implementations, in coding the plurality of information bits by LDPC encoding and transmitting the plurality of subcarriers, process 1100 may involve processor 1012 performing the LDPC encoding using the LDPC tone mapper 10122 on the plurality of subcarriers with one or more parameters used for a rRU in generating the dRU or the dMRU.

In some implementations, in coding the plurality of information bits by LDPC encoding and transmitting the plurality of subcarriers, process 1100 may involve processor 1012 performing the LDPC encoding using the LDPC tone mapper 10122 on the plurality of subcarriers with the one or more optimization parameters in generating the dRU or the dMRU.

In some implementations, the one or more optimization parameters may include tone mapper parameters with respect to $D_{TM}$. In some implementations, $D_{TM}=1$ or 3 or 6 for a 26-tone dRU; $D_{TM}=1$ or 8 or 12 for a 52-tone dRU; $D_{TM}=1$ or 9 or 12 for a 78-tone dMRU; $D_{TM}=1$ or 3 or 17 for a 106-tone dRU; $D_{TM}=1$ or 9 or 14 for a 132-tone dMRU; $D_{TM}=1$ or 9 or 13 or 18 for a 242-tone dRU or dMRU; and $D_{TM}=1$ or 12 or 18 or 26 for a 484-tone dRU or dMRU.

In some implementations, in coding the plurality of information bits by LDPC encoding and transmitting the plurality of subcarriers, process 1100 may involve processor 1012 performing the LDPC encoding using the LDPC tone mapper 10122 on the plurality of subcarriers with a joint tone mapper in generating the dMRU.

In some implementations, in processing the plurality of subcarriers, process 1100 may involve processor 1012 coding the plurality of information bits by BCC encoding and transmitting the plurality of subcarriers using the BCC interleaver 10124.

In some implementations, in coding the plurality of information bits by BCC encoding and transmitting the plurality of subcarriers, process 1100 may involve processor 1012 performing the BCC encoding using the BCC interleaver 10124 with one or more BCC interleaver parameters used for a rRU in generating the dRU or the dMRU.

In some implementations, in coding the plurality of information bits by BCC encoding and transmitting on the plurality of subcarriers, process 1100 may involve processor 1012 performing the BCC encoding using the BCC interleaver 10124 with the one or more optimization parameters in generating the dRU or the dMRU.

In some implementations, the one or more optimization parameters may include BCC interleaver parameters with respect to $N_{col}$, $N_{row}$, $N_{rot}$ and $N_{bpscs}$. In some implementations, $N_{col}=8$, $N_{row}=3\times N_{bpscs}$, and $N_{rot}=2$ for a 26-tone dRU; $N_{col}=16$, $N_{row}=3\times N_{bpscs}$, and $N_{rot}=11$ for a 52-tone dRU; $N_{col}=8$, $N_{row}=6\times N_{bpscs}$, and $N_{rot}=11$ for the 52-tone dRU on a 20 MHz bandwidth; $N_{col}=18$, $N_{row}=4\times N_{bpscs}$, and $N_{rot}=18$ for a 78-tone dMRU; $N_{col}=12$, $N_{row}=6\times N_{bpscs}$, and $N_{rot}=18$ for the 78-tone dMRU on the 20 MHz bandwidth; $N_{col}=17$, $N_{row}=6\times N_{bpscs}$, and $N_{rot}=29$ for a 106-tone dRU; $N_{col}=21$, $N_{row}=6\times N_{bpscs}$, and $N_{rot}=31$ for a 132-tone dMRU; $N_{col}=14$, $N_{row}=9\times N_{bpscs}$, and $N_{rot}=31$ for the 132-tone dMRU on the 20 MHz bandwidth; and $N_{col}=26$, $N_{row}=9\times N_{bpscs}$, and $N_{rot}=58$ for a 242-tone dRU or dMRU.

In some implementations, in coding the plurality of information bits by BCC encoding and transmitting the plurality of subcarriers, process 1100 may involve processor 1012 performing the BCC encoding using the BCC interleaver 10124 with a joint BCC interleaver in generating the dMRU.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
processing, by a processor of an apparatus, a plurality of subcarriers of a resource unit (RU) to generate a distributed-tone RU (dRU) or a distributed-tone multi-RU (dMRU); and
transmitting, by the processor via a transmitter of the apparatus, the dRU or the dMRU to another apparatus, wherein the processing of the plurality of subcarriers comprises coding a plurality of information bits by either low-density parity-check (LDPC) encoding or binary convolutionally-coded (BCC) encoding and transmitting the plurality of subcarriers with one or more optimization parameters using a LDPC tone mapper or a BCC interleaver, wherein the one or more optimization parameters comprise tone mapper parameters with respect to a tone mapping distance ($D_{TM}$),
wherein the one or more optimization parameters further comprise BCC interleaver parameters with respect to a number of columns ($N_{col}$), a number of rows ($N_{row}$), a number of rotations ($N_{rot}$) and a number of coded bits per subcarrier spacing ($N_{bpscs}$), and
wherein:
$D_{TM}$=3 or 6 for a 26-tone dRU;
$D_{TM}$=1 or 8 or 12 for a 52-tone dRU;
$D_{TM}$=1 or 9 or 12 for a 78-tone dMRU;
$D_{TM}$=1 or 3 or 17 for a 106-tone dRU;
$D_{TM}$=1 or 9 for a 132-tone dMRU;
$D_{TM}$=1 or 13 or 18 for a 242-tone dRU or dMRU;
$D_{TM}$=1 or 18 or 26 for a 484-tone dRU or dMRU;
$N_{col}$=8, $N_{row}$=3×$N_{bpscs}$, and $N_{rot}$=2 for the 26-tone dRU;
$N_{col}$=16, $N_{row}$=3×$N_{bpscs}$, and $N_{rot}$=11 for the 52-tone dRU;
$N_{col}$=8, $N_{row}$=6×$N_{bpscs}$, and $N_{rot}$=11 for the 52-tone dRU on a 20 MHz bandwidth;
$N_{col}$=18, $N_{row}$=4×$N_{bpscs}$, and $N_{rot}$=18 for the 78-tone dMRU;
$N_{col}$=12, $N_{row}$=6×$N_{bpscs}$, and $N_{rot}$=18 for the 78-tone dMRU on the 20 MHz bandwidth;
$N_{col}$=17, $N_{row}$=6×$N_{bpscs}$, and $N_{rot}$=29 for the 106-tone dRU;
$N_{col}$=21, $N_{row}$=6×$N_{bpscs}$, and $N_{rot}$=31 for the 132-tone dMRU;
$N_{col}$=14, $N_{row}$=9×$N_{bpscs}$, and $N_{rot}$=31 for the 132-tone dMRU on the 20 MHz bandwidth; and
$N_{col}$=26, $N_{row}$=9×$N_{bpscs}$, and $N_{rot}$=58 for the 242-tone dRU or dMRU.

2. The method of claim 1, wherein the processing of the plurality of subcarriers comprises coding the plurality of information bits by LDPC encoding and transmitting the plurality of subcarriers using the LDPC tone mapper.

3. The method of claim 2, wherein the coding of the plurality of information bits by LDPC encoding and transmitting the plurality of subcarriers using the LDPC tone mapper comprises enabling or disabling the LDPC tone mapper based on a value of the tone mapping distance ($D_{TM}$).

4. The method of claim 3, wherein the LDPC tone mapper is enabled responsive to $D_{TM}$>1.

5. The method of claim 3, wherein the LDPC tone mapper is disabled or bypassed responsive to $D_{TM}$=1.

6. The method of claim 2, wherein the coding of the plurality of information bits by LDPC encoding and transmitting the plurality of subcarriers comprises performing the LDPC encoding using the LDPC tone mapper on the plurality of subcarriers with one or more parameters used for a regular resource units (rRU) in generating the dRU or the dMRU.

7. The method of claim 2, wherein the coding of the plurality of information bits by LDPC encoding and transmitting the plurality of subcarriers comprises performing the LDPC encoding using the LDPC tone mapper on the plurality of subcarriers with the one or more optimization parameters in generating the dRU or the dMRU.

8. The method of claim 2, wherein the coding of the plurality of information bits by LDPC encoding and transmitting the plurality of subcarriers comprises performing the LDPC encoding using the LDPC tone mapper with a joint tone mapper in generating the dMRU.

9. The method of claim 1, wherein the processing of the plurality of subcarriers comprises coding the plurality of information bits by BCC encoding and transmitting the plurality of subcarriers using the BCC interleaver.

10. The method of claim 9, wherein the coding of the plurality of the information bits by BCC encoding and transmitting the plurality of subcarriers comprises performing the BCC encoding using the BCC interleaver with one or more BCC interleaver parameters used for a regular resource units (rRU) in generating the dRU or the dMRU.

11. The method of claim 9, wherein the coding of the plurality of information bits by BCC encoding and transmitting the plurality of subcarriers comprises performing the BCC encoding using the BCC interleaver with the one or more optimization parameters in generating the dRU or the dMRU.

12. The method of claim 9, wherein the coding of the plurality of information bits by BCC encoding and transmitting the plurality of subcarriers comprises performing the BCC encoding using the BCC interleaver with a joint BCC interleaver in generating the dMRU.

13. An apparatus, comprising:
a transceiver configured to transmit and receive wirelessly; and
a processor coupled to the transceiver and configured to perform operations comprising:
processing a plurality of subcarriers of a resource unit (RU) to generate a distributed-tone RU (dRU) or a distributed-tone multi-RU (dMRU); and
transmitting, via the transmitter, the dRU or the dMRU to another apparatus,
wherein, in processing the plurality of subcarriers, the processor is configured to code a plurality of information bits by either low-density parity-check (LDPC) encoding or binary convolutionally-coded (BCC) encoding and transmitting the plurality of subcarriers with one or more optimization parameters using a LDPC tone mapper or a BCC interleaver,
wherein the one or more optimization parameters comprise tone mapper parameters with respect to a tone mapping distance ($D_{TM}$),
wherein the one or more optimization parameters further comprise BCC interleaver parameters with respect to a number of columns ($N_{col}$), a number of rows ($N_{row}$), a number of rotations ($N_{rot}$) and a number of coded bits per subcarrier spacing ($N_{bpscs}$), and
wherein:
$D_{TM}$=3 or 6 for a 26-tone dRU;
$D_{TM}$=1 or 8 or 12 for a 52-tone dRU;
$D_{TM}$=1 or 9 or 12 for a 78-tone dMRU;
$D_{TM}$=1 or 3 or 17 for a 106-tone dRU;
$D_{TM}$=1 or 9 for a 132-tone dMRU;
$D_{TM}$=1 or 13 or 18 for a 242-tone dRU or dMRU;
$D_{TM}$=1 or 18 or 26 for a 484-tone dRU or dMRU;
$N_{col}$=8, $N_{row}$=3×$N_{bpscs}$, and $N_{rot}$=2 for the 26-tone dRU;
$N_{col}$=16, $N_{row}$=3×$N_{bpscs}$, and $N_{rot}$=11 for the 52-tone dRU;
$N_{col}$=8, $N_{row}$=6×$N_{bpscs}$, and $N_{rot}$=11 for the 52-tone dRU on a 20 MHz bandwidth;
$N_{col}$=18, $N_{row}$=4×$N_{bpscs}$, and $N_{rot}$=18 for the 78-tone dMRU;
$N_{col}$=12, $N_{row}$=6×$N_{bpscs}$, and $N_{rot}$=18 for the 78-tone dMRU on the 20 MHZ bandwidth;
$N_{col}$=17, $N_{row}$=6×$N_{bpscs}$, and $N_{rot}$=29 for the 106-tone dRU;
$N_{col}$=21, $N_{row}$=6×$N_{bpscs}$, and $N_{rot}$=31 for the 132-tone dMRU;
$N_{col}$=14, $N_{row}$=9×$N_{bpscs}$, and $N_{rot}$=31 for the 132-tone dMRU on the 20 MHz bandwidth; and
$N_{col}$=26, $N_{row}$=9×$N_{bpscs}$, and $N_{rot}$=58 for the 242-tone dRU or dMRU.

14. The apparatus of claim 13, wherein, in processing the plurality of subcarriers, the processor is configured to code the plurality of information bits by LDPC encoding and transmitting the plurality of subcarriers using the LDPC tone mapper with the LDPC tone mapper either enabled or disabled based on a value of the tone mapping distance ($D_{TM}$).

15. The apparatus of claim 14, wherein, in coding the plurality of information bits by LDPC encoding and transmitting the plurality of subcarriers, the processor is configured to perform the LDPC encoding with the LDPC tone mapper on the plurality of subcarriers using:
one or more parameters used for a regular resource units (rRU) in generating the dRU or the dMRU; or
the one or more optimization parameters in generating the dRU or the dMRU.

16. The apparatus of claim 13, wherein, in processing the plurality of subcarriers, the processor is configured to code the plurality of information bits by BCC encoding and transmitting the plurality of subcarriers using the BCC interleaver.

17. The apparatus of claim 16, wherein, in coding the information bits by BCC encoding and transmitting the plurality of subcarriers, the processor is configured to perform the BCC encoding with the BCC interleaver using:
one or more BCC interleaver parameters used for a regular resource units (rRU) in generating the dRU or the dMRU; or
the one or more optimization parameters in generating the dRU or the dMRU.

18. The apparatus of claim 13, wherein:
in coding the plurality of subcarriers by LDPC encoding, the processor is configured to code the plurality of information bits by LDPC encoding using the LDPC tone mapper with a joint tone mapper in generating the dMRU, and
in coding the plurality of information bits by BCC encoding, the processor is configured to perform the BCC encoding using the BCC interleaver with a joint BCC interleaver in generating the dMRU.

* * * * *